(12) United States Patent
Sato et al.

(10) Patent No.: US 7,729,104 B2
(45) Date of Patent: Jun. 1, 2010

(54) TANTALUM POWDER AND SOLID ELECTROLYTE CAPACITOR INCLUDING THE SAME

(75) Inventors: Nobuyuki Sato, Chiba (JP); Osamu Ebato, Chiba (JP); Tadasu Kirihara, Chiba (JP)

(73) Assignee: JFE Mineral Company, Ltd., Tokyo (JP)

( * ) Notice: Subject to any disclaimer, the term of this patent is extended or adjusted under 35 U.S.C. 154(b) by 862 days.

(21) Appl. No.: 11/547,588

(22) PCT Filed: Apr. 12, 2005

(86) PCT No.: PCT/JP2005/007371

§ 371 (c)(1),
(2), (4) Date: Oct. 5, 2006

(87) PCT Pub. No.: WO2005/099935

PCT Pub. Date: Oct. 27, 2005

(65) Prior Publication Data

US 2008/0273292 A1    Nov. 6, 2008

(30) Foreign Application Priority Data

Apr. 15, 2004  (JP) ............... 2004-119823

(51) Int. Cl.
*H01G 9/042* (2006.01)
(52) U.S. Cl. .............. 361/529; 361/523; 361/525; 361/528; 361/508; 361/519
(58) Field of Classification Search ......... 361/523–525, 361/528–530, 516–519, 508–509; 75/244, 75/255; 29/25.01, 25.03
See application file for complete search history.

(56) References Cited

U.S. PATENT DOCUMENTS

| | | | |
|---|---|---|---|
| 3,295,951 A | 1/1967 | Fincham et al. | |
| 5,082,491 A * | 1/1992 | Rerat | 75/255 |
| 5,580,367 A * | 12/1996 | Fife | 75/255 |
| 5,622,746 A * | 4/1997 | Hahn et al. | 427/79 |
| 5,986,877 A * | 11/1999 | Pathare et al. | 361/508 |
| 6,193,779 B1 * | 2/2001 | Reichert et al. | 75/343 |
| 6,238,456 B1 | 5/2001 | Wolf et al. | |
| 6,679,934 B2 * | 1/2004 | Rao et al. | 75/245 |
| 7,066,975 B2 * | 6/2006 | Oda et al. | 75/244 |
| 7,361,202 B2 * | 4/2008 | Naito et al. | 75/245 |
| 2002/0088507 A1 | 7/2002 | Rao et al. | |

FOREIGN PATENT DOCUMENTS

| | | |
|---|---|---|
| JP | 02-149601 A | 6/1990 |
| JP | 2632985 B2 | 4/1997 |
| JP | 2001-223141 A | 8/2001 |

(Continued)

*Primary Examiner*—Nguyen T Ha
(74) *Attorney, Agent, or Firm*—Frishauf, Holtz, Goodman & Chick, P.C.

(57) ABSTRACT

In a hydrogen-containing tantalum powder of the present invention, a value obtained by dividing the hydrogen content (ppm) by the specific surface area ($m^2/g$) is in the range of 10 to 100. This tantalum powder has a large specific surface area, and when the tantalum powder is used as an anode of a solid electrolyte capacitor, a solid electrolyte capacitor having a large capacitance and a low leakage current can be obtained.

16 Claims, 2 Drawing Sheets

FOREIGN PATENT DOCUMENTS

| | | |
|---|---|---|
| JP | 2001-345238 A | 12/2001 |
| JP | 2002-030301 A | 1/2002 |
| JP | 2002-173371 A | 6/2002 |
| JP | 2003-055702 A | 2/2003 |
| JP | 2003-178935 A | 6/2003 |
| JP | 2003-342603 A | 12/2003 |
| WO | WO 98/37249 A1 | 8/1998 |

* cited by examiner

TANTALUM POWDER AND SOLID ELECTROLYTE CAPACITOR INCLUDING THE SAME

This application is the U.S. national phase application of International Application PCT/JP2005/007371 filed Apr. 12, 2005.

TECHNICAL FIELD

The present invention relates to a hydrogen-containing tantalum powder that is suitable for an anode material of a solid electrolyte capacitor, an anode for a solid electrolyte capacitor that is produced by sintering the tantalum powder, and a solid electrolyte capacitor including the anode.

BACKGROUND ART

Recently, in electronic integrated circuits, operation at a lower voltage, an increase in the operation frequency, and a reduction in noise have been desired. In solid electrolyte capacitors, demands for reducing equivalent series resistance (ESR) and for reducing equivalent series inductance (ESL) have been increasing. Examples of a metal powder that is preferably used as an anode material of a solid electrolyte capacitor include powders composed of tantalum, niobium, titanium, tungsten, or molybdenum. Among these, in particular, capacitors including tantalum have become rapidly widespread as components of cell phones, personal computers, and the like because of their low ESR and high capacitance. Recently, a further increase in the capacitance and a further decrease in ESR of capacitors have been desired. In order to further increase the capacitance of a capacitor, tantalum powders having a large specific surface area and a fine particle size have been developed as an anode material of the capacitor. However, when the specific surface area of the powder is increased, the oxygen content of the powder is also increased. Consequently, a crystalline oxide is easily produced during heat treatment and anodic oxidation, resulting in a problem of an increase in leakage current. When the rated voltage of a capacitor is set to a low value, the anodic oxidation voltage at which a dielectric oxide film is formed can be decreased. However, when the anodic oxidation voltage is decreased, the thickness of the resulting dielectric oxide film tends to be decreased, resulting in an increase in leakage current. Thus, such a capacitor is disadvantageous in that a long-term reliability is not satisfactory. In order to suppress such an effect of oxygen and to improve the reliability of a thin film, a method of doping a non-oxidizing gas or various types of element is known.

For example, Japanese Unexamined Patent Application Publication Nos. 2001-223141, 2001-345238, 2002-30301, and 2003-55702 describe techniques for doping nitrogen into a tantalum powder.

According to Japanese Unexamined Patent Application Publication No. 2001-223141, an anode having a high capacitance and a low leakage current can be produced by adding 50 to 20,000 ppm of nitrogen to tantalum in the form of a solid solution.

According to Japanese Unexamined Patent Application Publication No. 2001-345238, 50 to 10,000 ppm of nitrogen is contained in tantalum, thereby decreasing the shrinkage percentage in sintering at high temperatures. As a result, a capacitor including an anode composed of a sintered body of this powder easily has a high capacitance and a low leakage current. Thus, a capacitor having high reliability can be produced.

According to a technique disclosed in Japanese Unexamined Patent Application Publication No. 2002-30301, 500 to 30,000 ppm of nitrogen is contained in a tantalum powder, and the variation in the nitrogen content between tantalum particles is controlled to 100% or less. When this material is sintered, an excessive sintering can be suppressed to obtain a porous sintered body that evenly includes voids having a size suitable for forming a solid electrolyte. The patent document discloses that the resulting porous sintered body is most suitable for a high capacitance voltage (CV) capacitor.

According to an example disclosed in Japanese Unexamined Patent Application Publication No. 2003-55702, nitrogen is contained in a tantalum powder having a specific surface area in the range of 1.0 to 4.0 ($m^2/g$) such that a value obtained by dividing the nitrogen content (ppm) by the specific surface area is in the range of 500 to 3,000. This patent document describes that when this tantalum powder is used as an anode material of a solid electrolyte capacitor, a solid electrolyte capacitor having a high capacitance, a low leakage current, and excellent long-term reliability can be obtained.

Regarding doping of other elements, Japanese Unexamined Patent Application Publication No. 2003-178935 discloses doping of phosphorus, Japanese Unexamined Patent Application Publication No. 2002-173371 discloses doping of zirconia, carbon, boron, or sulfur, and Japanese Patent No. 2632985 discloses doping of titanium, zirconium, or hafnium.

A tantalum powder used for an anode of a solid electrolyte capacitor is prepared by performing anodic oxidation of a tantalum powder in an electrolytic solution to form a dielectric oxide film on the surface of the powder. Accordingly, it is known that the capacitance correlates with the specific surface area of the tantalum powder, and that a large specific surface area can provide a solid electrolyte capacitor having higher capacitance. However, in the case where the tantalum powder has a large specific surface area, even when nitrogen or another element is doped using the above-described doping techniques according to the descriptions of Japanese Unexamined Patent Application Publication Nos. 2001-223141, 2001-345238, 2002-30301, 2003-55702, 2003-178935, and 2002-173371, and Japanese Patent No. 2632985, a solid electrolyte capacitor having a high capacitance and low leakage current is not always obtained. The present inventors have found that, in particular, when the specific surface area of the tantalum powder is 4 $m^2/g$ or more, the above tendency is significant.

Accordingly, an object of the present invention is to provide a tantalum powder having a large specific area wherein when the powder is used as an anode of a solid electrolyte capacitor, a tantalum solid electrolyte capacitor having a large capacitance and a low leakage current can be obtained. Furthermore, another object of the present invention is to provide an anode for a solid electrolyte capacitor produced by sintering the tantalum powder and a solid electrolyte capacitor including the anode.

DISCLOSURE OF INVENTION

The present invention provides a hydrogen-containing tantalum powder wherein a value obtained by dividing the hydrogen content (mass ppm, hereinafter simply referred to as ppm) of the tantalum powder by the specific surface area ($m^2/g$) of the tantalum powder is in the range of 10 to 100. Hereinafter, the term "specific surface area" in the present invention represents a value of a specific surface area measured by the BET method.

Preferably, the tantalum powder of the present invention further contains nitrogen wherein a value obtained by dividing the nitrogen content (mass ppm, hereinafter simply referred to as ppm) of the tantalum powder by the specific surface area of the tantalum powder is 500 or less.

In the tantalum powder of the present invention, the specific surface area of the tantalum powder is preferably in the range of 4 to 10 $m^2/g$.

The present invention further provides an anode for a solid electrolyte capacitor including the tantalum powder of the present invention and a solid electrolyte capacitor including the anode.

In the anode for a solid electrolyte capacitor of the present invention and the solid electrolyte capacitor including the anode, the tantalum powder preferably contains hydrogen and nitrogen, the specific surface area ($m^2/g$) of the tantalum powder is in the range of 4 to 10 $m^2/g$, the value obtained by dividing the hydrogen content (ppm) of the tantalum powder by the specific surface area ($m^2/g$) of the tantalum powder is in the range of 10 to 100, and the value obtained by dividing the nitrogen content (ppm) of the tantalum powder by the specific surface area ($m^2/g$) of the tantalum powder is 500 or less.

The tantalum powder of the present invention contains hydrogen in an amount in which the value obtained by dividing the hydrogen content (ppm) by the specific surface area ($m^2/g$) is in the range of 10 to 100, and preferably further contains nitrogen in an amount in which the value obtained by dividing the nitrogen content (ppm) by the specific surface area ($m^2/g$) is 500 or less. Although this tantalum powder has a large specific surface area, and more preferably, has a specific surface area in the range of 4 to 10 $m^2/g$, the leakage current can be controlled to a low value when the tantalum powder is used as an anode of a solid electrolyte capacitor.

Accordingly, the solid electrolyte capacitor including a sintered body of the tantalum powder of the present invention as an anode is a highly reliable solid electrolyte capacitor having a large capacitance and a low leakage current. In particular, a tantalum solid electrolyte capacitor having a capacitance of 200,000 μFV/g or more and a leakage current of 1.0 nA/μFV or less can be obtained.

Since the solid electrolyte capacitor of the present invention has a large capacitance, a compact, and more preferably, thin capacitor can be provided. Thus, the solid electrolyte capacitor of the present invention greatly contributes to a reduction in size of electric equipment and electronic equipment.

BEST MODE FOR CARRYING OUT THE INVENTION

Figure 1:
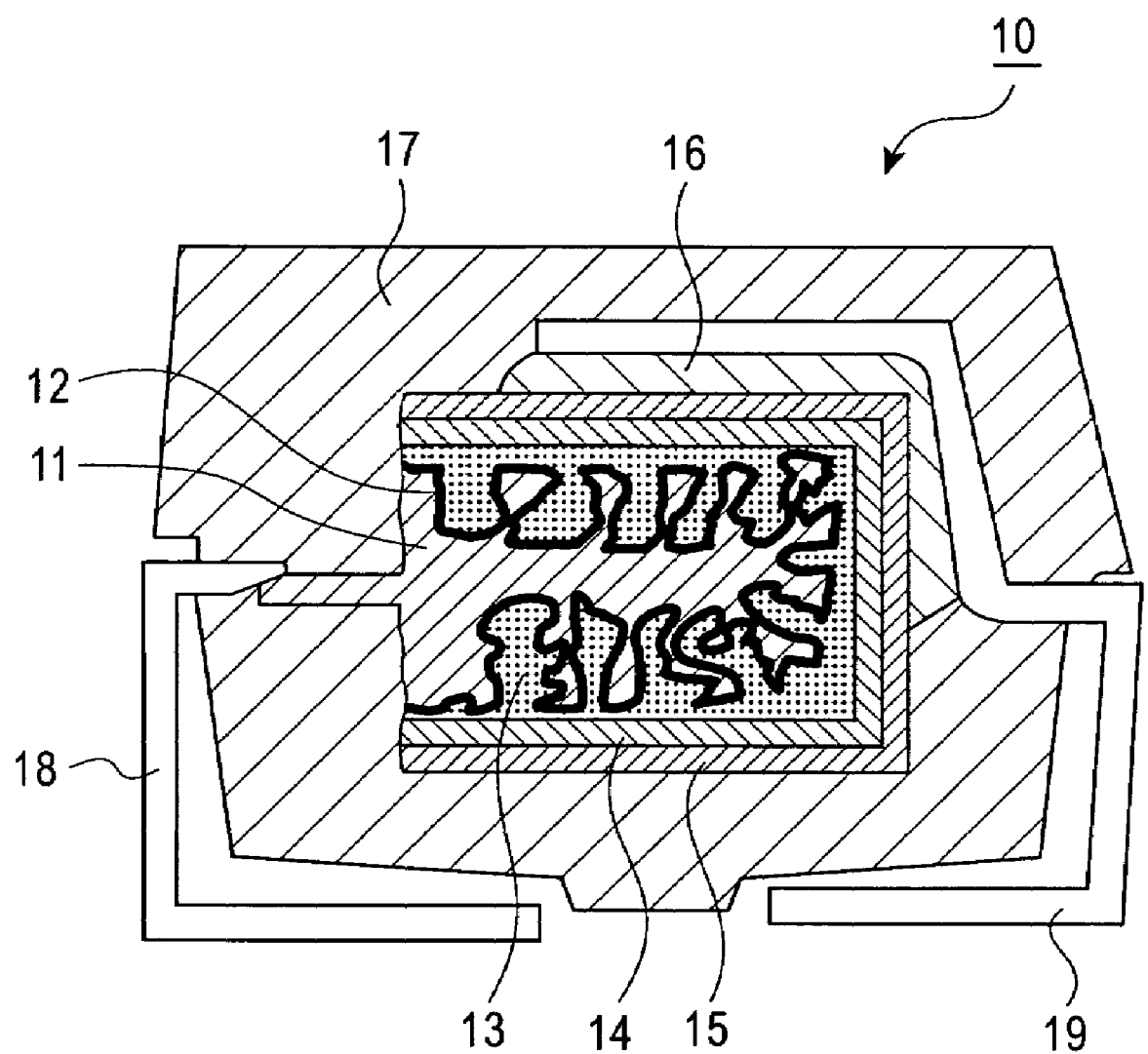
FIG. 1 is a schematic cross-sectional view of a solid electrolyte capacitor.

In order to achieve the above objects, the present inventors have conducted intensive studies and found the following. When a tantalum powder has a large specific surface area, it is desirable that an appropriate amount of hydrogen is contained as a dopant in the tantalum powder instead of nitrogen, phosphorus, titanium, zirconia, hafnium, carbon, boron, or sulfur, which is a known dopant, and it is desirable that appropriate amounts of hydrogen and nitrogen are contained in the tantalum powder. These findings led to the completion of the present invention.

The present invention will now be described in detail.

(1) Tantalum Powder of the Present Invention

A tantalum powder of the present invention is a hydrogen-containing tantalum powder wherein a value obtained by dividing the hydrogen content (ppm) of the tantalum powder by the specific surface area ($m^2/g$) of the tantalum powder is in the range of 10 to 100. A value of a specific surface area measured by the BET method is used as the specific surface area in the present invention.

In the tantalum powder of the present invention, hydrogen exhibits an effect of controlling the leakage current to a low value in a solid electrolyte capacitor including a sintered body of the tantalum powder.

The tantalum powder of the present invention contains hydrogen in an amount that satisfies the above value. Consequently, even when the specific surface area of the tantalum powder of the present invention is larger than that of a known tantalum powder, the tantalum powder can provide a solid electrolyte capacitor having a low leakage current and excellent long-term reliability.

When the above value is less than 10, the leakage current of the solid electrolyte capacitor is high and a satisfactorily high capacitance cannot be obtained. On the other hand, when the value exceeds 100, the leakage current of the solid electrolyte capacitor is increased instead and the capacitance is decreased.

It is believed that hydrogen is present in the vicinity of the surface of the tantalum powder and affects the characteristics of the dielectric film during the formation of the dielectric film. In particular, when the value is in the range of 10 to 100, a dense dielectric film is formed and the effect of reducing the leakage current is markedly exhibited. When the value exceeds 100, the hydrogen content of the dielectric film is excessively large and the dielectric film is degraded, thus increasing the leakage current. In addition, it is believed that since a part of hydrogen is diffused inside the tantalum powder to form a hydride of tantalum, the capacitance is decreased.

The tantalum powder of the present invention preferably further contains nitrogen, and a value obtained by dividing the nitrogen content (ppm) of the tantalum powder by the specific surface area ($m^2/g$) of the tantalum powder is preferably 500 or less.

When the tantalum powder contains nitrogen in an amount that satisfies the above value, an excellent effect of controlling the leakage current of the solid electrolyte capacitor to a low value can be exhibited. When the value is 500 or less, the leakage current of the solid electrolyte capacitor can be controlled to a lower value, and the capacitance of the solid electrolyte capacitor is high. The value is more preferably in the range of 40 to 300.

It is believed that nitrogen has substantially the same function as that of hydrogen. It is believed that nitrogen is also present in the vicinity of the surface of the tantalum powder and affects the characteristics of the dielectric film during the formation of the dielectric film. It is believed that when the value is 500 or less, a dense dielectric film is formed and the effect of reducing the leakage current can be markedly exhibited.

The contents of hydrogen and nitrogen in the tantalum powder can be determined by the following method. For example, an analysis sample is heated or melted by heating in a resistance heating furnace, a high-frequency induction heating furnace, an impact furnace, or the like in vacuum or in an inert gas stream. The contents of emitted hydrogen and nitrogen are determined by a thermal conductivity analysis method. Alternatively, the contents may be determined by a chemical method (the Kjeldahl method).

A feature of the present invention is that the tantalum powder contains hydrogen, or preferably hydrogen and nitrogen in an amount that satisfies the above value. That is, the effect of controlling the leakage current of the resulting solid electrolyte capacitor to a low value is more effectively exhibited when the tantalum powder has a large specific surface area.

Therefore, the specific surface area of the tantalum powder of the present invention is preferably in the range of 4 to 10 $m^2/g$.

In the case where the specific surface area is 4 $m^2/g$ or more, even when the tantalum powder contains hydrogen and nitrogen in certain amounts, the dielectric oxide film has a high density. Therefore, the effect of controlling the leakage current of the solid electrolyte capacitor to a low value is markedly exhibited. On the other hand, when the specific surface area is 10 $m^2/g$ or less, the particle size of the powder is moderate from the standpoint of producing a powder used for an anode of a solid electrolyte capacitor. When the tantalum powder is used as an anode material of a solid electrolyte capacitor, the tantalum powder is sintered and is then subjected to anodic oxidation to form an oxide film. In this process, tantalum is consumed in the form of the oxide film, and the amount of remaining tantalum that is not oxidized is decreased. Even when the specific surface area is 10 $m^2/g$ or less, in the case where the tantalum powder has a large particle size, a required amount of tantalum remains after the anodic oxidation without being oxidized. Accordingly, the effect of a decrease in the area of an electrode is small, and thus a solid electrolyte capacitor having a high capacitance can be produced. The specific surface area of the tantalum powder is more preferably in the range of 4 to 8.5 $m^2/g$.

Particles of a tantalum powder often form secondary clusters in the form of a bunch of grapes or a coral. Therefore, in order to suitably carry out the present invention, a preferred particle size of the tantalum powder of the present invention is preferably in the range of 36 to 90 nm in terms of a BET diameter (determined from a BET specific surface area). Alternatively, a primary particle size of the tantalum powder is determined to be preferably in the range of 20 to 150 nm by visual observation using a scanning electron microscope (SEM). The above lower limits are specified for the case in which all the particles become oxidized in the anodic oxidation and do not contribute to the capacitance. The above upper limits are specified for the case in which a large capacitance cannot be obtained.

(2) Process of Producing Tantalum Powder

A process of producing the above-described tantalum powder of the present invention can be selected from known production processes as long as a tantalum powder having a large specific surface area can be produced. Preferably, a tantalum powder having a BET specific surface area in the range of 4 to 10 $m^2/g$ is produced.

Specific examples of the production process include a sodium reduction process of potassium fluorotantalate, a magnesium reduction process of a tantalum oxide, a gas-phase hydrogen reduction process of tantalum pentachloride, and a pulverizing process of tantalum metal.

A tantalum powder having a desired specific surface area is produced by the above production process. The resulting tantalum powder is subjected to a post-treatment such that the tantalum powder contains hydrogen, or preferably hydrogen and nitrogen in an amount or amounts that satisfy the above-described value or values to produce the tantalum powder of the present invention.

(3) Process of Adjusting Hydrogen Content and Nitrogen Content of Tantalum Powder A tantalum powder containing a predetermined amount of hydrogen or predetermined amounts of hydrogen and nitrogen can be produced by heating the tantalum powder obtained above in a stream of hydrogen and a noble gas such as argon, helium, or neon (the case where a tantalum powder containing hydrogen is produced) or in a stream of hydrogen, nitrogen, and a noble gas such as argon, helium, or neon (the case where a tantalum powder containing hydrogen and nitrogen is produced), respectively. The hydrogen content and the nitrogen content in the tantalum powder can be controlled by adjusting any one of the temperature of the heat treatment, the time of the heat treatment, and the gas composition that is supplied during the heat treatment, or by adjusting combinations of these parameters.

According to suitable processing conditions, the temperature of the heat treatment is in the range of 300° C. to 1,000° C., the time of the heat treatment is in the range of 1 to 60 minutes, and the partial pressure of nitrogen and hydrogen in the noble gas is in the range of 0.001 to 0.1.

In order to obtain the tantalum powder of the present invention, among the above-described production processes, the gas-phase hydrogen reduction process of tantalum pentachloride is most preferred. In the gas-phase hydrogen reduction process of tantalum pentachloride, tantalum pentachloride and hydrogen for reduction are introduced into an argon plasma, and a gas-phase hydrogen reduction reaction is conducted in the argon plasma using a plasma chemical vapor deposition (CVD) process to produce a tantalum powder. The specific surface area of the tantalum powder produced by the plasma CVD process can be controlled by adjusting the flow rate of the argon gas for generating plasma, the flow rate of the hydrogen gas for reduction, and the amount of tantalum pentachloride introduced. Specifically, preferable ranges are represented by Ar (mol)/$TaCl_5$ (mol)=3 to 90 and $H_2$/$TaCl_5$ (mol)=5 to 400. More preferable ranges are represented by Ar (mol)/$TaCl_5$ (mol)=5 to 90 and $H_2$/$TaCl_5$ (mol)=10 to 400. Although the hydrogen content of the resulting tantalum powder depends on the BET specific surface area, the tantalum powder generally contains hydrogen in an amount of 500 to 1,200 ppm.

When the gas-phase hydrogen reduction process of tantalum pentachloride is employed, the hydrogen content and the nitrogen content can be simultaneously adjusted in the step of this gas-phase hydrogen reduction reaction. Specifically, in the case of a tantalum powder containing only hydrogen, a tantalum powder containing a desired content of hydrogen can be obtained by adjusting the amount of hydrogen in the argon plasma during the gas-phase hydrogen reduction reaction. In the case of a tantalum powder containing hydrogen and nitrogen, a tantalum powder containing desired contents of hydrogen and nitrogen can be obtained by supplying nitrogen together with hydrogen during the gas-phase hydrogen reduction reaction.

(4) Method of Producing Solid Electrolyte Capacitor including Tantalum Powder

Next, a solid electrolyte capacitor is produced using the tantalum powder of the present invention. FIG. 1 is a schematic longitudinal cross-sectional view of a solid electrolyte capacitor. A solid electrolyte capacitor 10 has a structure in which a tantalum sintered body 11, a tantalum oxide 12, a solid electrolyte 13, graphite 14, and silver 15 are laminated.

The process for producing the solid electrolyte capacitor 10 is as follows.

First, 3 to 5 mass percent of a binder is added to the tantalum powder prepared above and is sufficiently mixed. Subsequently, a rectangular parallelepiped pellet having a length of 2.4 mm, a width of 3.4 mm, and a thickness of 1.8 mm is prepared by a press molding. The load during pressing is preferably in the range of 3 to 15 MN (meganewtons)/m$^2$, and the apparent (bulk) density of the pressed body is preferably in the range of 3,200 to 4,000 kg/m$^3$. Preferred examples of the binder include at least one selected from camphor, stearic acid, polyvinyl alcohol, naphthalene, and the like.

The pellet is sintered by heating in a vacuum of a furnace pressure of $1 \times 10^{-3}$ Pa or lower at a temperature in the range of about 1,000° C. to 1,400° C. for about 0.3 to 1 hour. The sintering temperature can be appropriately set according to the specific surface area. Thereby, a porous tantalum sintered body is prepared. The resulting tantalum sintered body is subjected to anodic oxidation to form an oxide film on the surface of the sintered body, thereby preparing an anode. In the anodic oxidation, for example, a 0.6 mass percent aqueous solution of phosphoric acid is used at a temperature of 80° C. The voltage is increased to 10 to 20 V at a current density of 140 A/g, and the anodic oxidation is performed under this condition for six hours.

Subsequently, a solid electrolyte layer 13 composed of, for example, polypyrrole or polythiophene, a graphite layer 14, and a silver layer 15 are formed on the surface of the sintered body in that order.

Finally, an outer terminal 18 (anode) is connected to the tantalum sintered body 11, and an outer terminal 19 (cathode) is connected to the silver layer 15 with an electroconductive adhesive 16 therebetween.

Finally, the entirety is covered with a resin 17 and aging is performed to obtain the solid electrolyte capacitor 10.

EXAMPLES

The present invention will now be described specifically by way of Examples.

Example 1

Argon was supplied to a DC plasma CVD system with an output power of 20 kW as an electrode working gas at a rate of 20 NL (normal litters)/min to generate a plasma arc under atmospheric pressure. A mixed gas of tantalum pentachloride (15 g/min in terms of the weight of tantalum pentachloride) vaporized at 350° C. and 10 NL/min of argon, and 80 NL/min of hydrogen gas for reduction were introduced into the plasma arc to conduct a gas-phase hydrogen reduction reaction. Thus a tantalum powder was prepared.

Ten gram of the tantalum powder was placed in a heating furnace. The tantalum powder was heated to a processing temperature of 300° C. at a rate of 10° C./min in a stream of a mixed gas of 5 NL/min of argon and 1 NL/min of nitrogen, and was then kept for 30 minutes. Subsequently, the temperature was decreased to room temperature in a stream of 5 NL/min of argon. The hydrogen content and the nitrogen content of the tantalum powder were measured with a thermal conductivity gas analyzer, and the specific surface area of the tantalum powder was measured by the BET method. The hydrogen content was measured with an RH404 produced by LECO Corporation, and the nitrogen content was measured with a TC600 produced by LECO Corporation. According to the results, the hydrogen content was 400 ppm, the nitrogen content was 200 ppm, the specific surface area was 4.2 m$^2$/g, the value obtained by dividing the hydrogen content by the specific surface area was 95, and the value obtained by dividing the nitrogen content by the specific surface area was 48.

Regarding electrical properties of this tantalum powder, a tantalum sintered element was produced, and the leakage current and the capacitance of the element were measured in accordance with the testing conditions of a 100,000 CV powder of EIAJ RC-2361A in Standard of Electronic Industries Association of Japan. According to the results, at a sintering temperature of 1,250° C., the leakage current was 0.5 nA/μFV and the capacitance was 200,000 μFV/g (see Table 1). The EIAJ RC-2361A is a method of testing tantalum sintered anodes for electric capacitors (revised in February 2002).

Examples 2 to 4

Comparative Examples 1 and 2

Tantalum sintered elements were produced and evaluated as in Example 1 except that the processing temperature at which the tantalum powder prepared by the gas-phase hydrogen reduction reaction in Example 1 was processed in a stream of a mixed gas of 5 NL/min of argon and 1 NL/min of nitrogen was changed to the temperatures shown in Table 1. The term "without treatment" in Comparative Example 2 means that the heat treatment in a stream of a mixed gas of 5 NL/min of argon and 1 NL/min of nitrogen was not performed. Table 1 shows the results.

In all of Example 1 and Examples 2 to 4, which were within the range of the present invention, the leakage current was 0.5 nA/μFV or less and the capacitance was 160,000 μFV/g or more. In contrast, since the values obtained by dividing the hydrogen content by the specific surface area in Comparative Examples 1 and 2 were out of the range of the present invention, the leakage current was higher than that of the Examples and the capacitance was lower than that of the Examples.

Example 5

Argon was supplied to a DC plasma CVD system with an output power of 20 kW as an electrode working gas at a rate of 20 NL/min to generate a plasma arc under atmospheric pressure. A mixed gas of tantalum pentachloride (10 g/min in the form of a tantalum pentachloride powder) vaporized at 350° C. and 10 NL/min of argon, and 100 NL/min of hydrogen gas were introduced into the plasma arc to conduct a gas-phase hydrogen reduction reaction. Thus a tantalum powder was prepared.

Ten gram of the tantalum powder was placed in a heating furnace. The tantalum powder was heated to a processing temperature of 200° C. at a rate of 10° C./min in a stream of a mixed gas of 5 NL/min of argon and 1 NL/min of nitrogen, and was then kept for 30 minutes. Subsequently, the temperature was decreased to room temperature in a stream of 5 NL/min of argon. The hydrogen content and the nitrogen content of the tantalum powder were measured with the thermal conductivity gas analyzer, and the specific surface area of the tantalum powder was measured by the BET method. According to the results, the hydrogen content was 600 ppm, the nitrogen content was 400 ppm, the specific surface area was 8.8 m$^2$/g, the value obtained by dividing the hydrogen content by the specific surface area was 68, and the value obtained by dividing the nitrogen content by the specific surface area was 45.

Regarding electrical properties of this tantalum powder, a tantalum sintered element was produced, and the leakage current and the capacitance of the element were measured in accordance with the testing conditions of a 100,000 CV powder of EIAJ RC-2361A in Standard of Electronic Industries Association of Japan. At a sintering temperature of 1,250° C., the leakage current was 0.8 nA/μFV and the capacitance was 420,000 μFV/g (see Table 2).

Examples 6 to 8

Comparative Examples 3 and 4

Tantalum sintered elements were produced and evaluated as in Example 5 except that the processing temperature at which the tantalum powder prepared by the gas-phase hydrogen reduction reaction in Example 5 was processed in a stream of a mixed gas of 5 NL/min of argon and 1 NL/min of nitrogen was changed to the temperatures shown in Table 2. The term "without treatment" in Comparative Example 4 means that the tantalum powder was not heat-treated in a stream of a mixed gas of 5 NL/min of argon and 1 NL/min of nitrogen. Table 2 shows the results.

In all of Example 5 and Examples 6 to 8, which were within the range of the present invention, the leakage current was 0.9 nA/μFV or less and the capacitance was 360,000 μFV/g or more. In contrast, since the values obtained by dividing the hydrogen content by the specific surface area in Comparative Examples 3 and 4 were out of the range of the present invention, the leakage current was higher than that of the Examples and the capacitance was lower than that of the Examples.

Example 9

Argon was supplied to a DC plasma CVD system with an output power of 40 kW as an electrode working gas at a rate of 20 NL/min to generate a plasma arc under atmospheric pressure. A mixed gas of tantalum pentachloride (20 g/min in the form of a tantalum pentachloride powder) vaporized at 350° C. and 10 NL/min of argon, and 100 NL/min of hydrogen gas were introduced into the plasma arc to conduct a gas-phase hydrogen reduction reaction. Thus a tantalum powder was prepared.

Ten gram of the tantalum powder was placed in a heating furnace. The tantalum powder was heated to a processing temperature of 400° C. at a rate of 10° C./min in a stream of a mixed gas of 5 NL/min of argon and 1 NL/min of nitrogen, and was then kept for 30 minutes. Subsequently, the temperature was decreased to room temperature in a stream of 5 NL/min of argon. The hydrogen content and the nitrogen content of the tantalum powder were measured with the thermal conductivity gas analyzer as in Example 1, and the specific surface area of the tantalum powder was measured by the BET method. According to the results, the hydrogen content was 200 ppm, the nitrogen content was 150 ppm, the specific surface area was 3.2 m$^2$/g, the value obtained by dividing the hydrogen content by the specific surface area was 63, and the value obtained by dividing the nitrogen content by the specific surface area was 47.

Regarding electrical properties of this tantalum powder, a tantalum sintered element was produced, and the leakage current and the capacitance of the element were measured in accordance with the testing conditions of a 100,000 CV powder of EIAJ RC-2361A in Standard of Electronic Industries Association of Japan. At a sintering temperature of 1,250° C., the leakage current was 0.4 nA/μFV and the capacitance was 144,000 μFV/g (see Table 3).

Examples 10 and 11

Comparative Examples 5 and 6

Tantalum sintered elements were produced and evaluated as in Example 9 except that the processing temperature at which the tantalum powder prepared by the gas-phase hydrogen reduction reaction in Example 9 was processed in a stream of a mixed gas of 5 NL/min of argon and 1 NL/min of nitrogen was changed to the temperatures shown in Table 3. The term "without treatment" in Comparative Example 6 means that the tantalum powder was not heat-treated in a stream of a mixed gas of 5 NL/min of argon and 1 NL/min of nitrogen. Table 3 shows the results.

In all of Example 9 and Examples 10 and 11, which were within the range of the present invention, the leakage current was 0.5 nA/μFV or less and the capacitance was 144,000 μFV/g or more. In contrast, since the values obtained by dividing the hydrogen content by the specific surface area in Comparative Examples 5 and 6 were out of the range of the present invention, the leakage current was higher than that of the Examples and the capacitance was lower than that of the Examples.

Example 12

Figure 2:
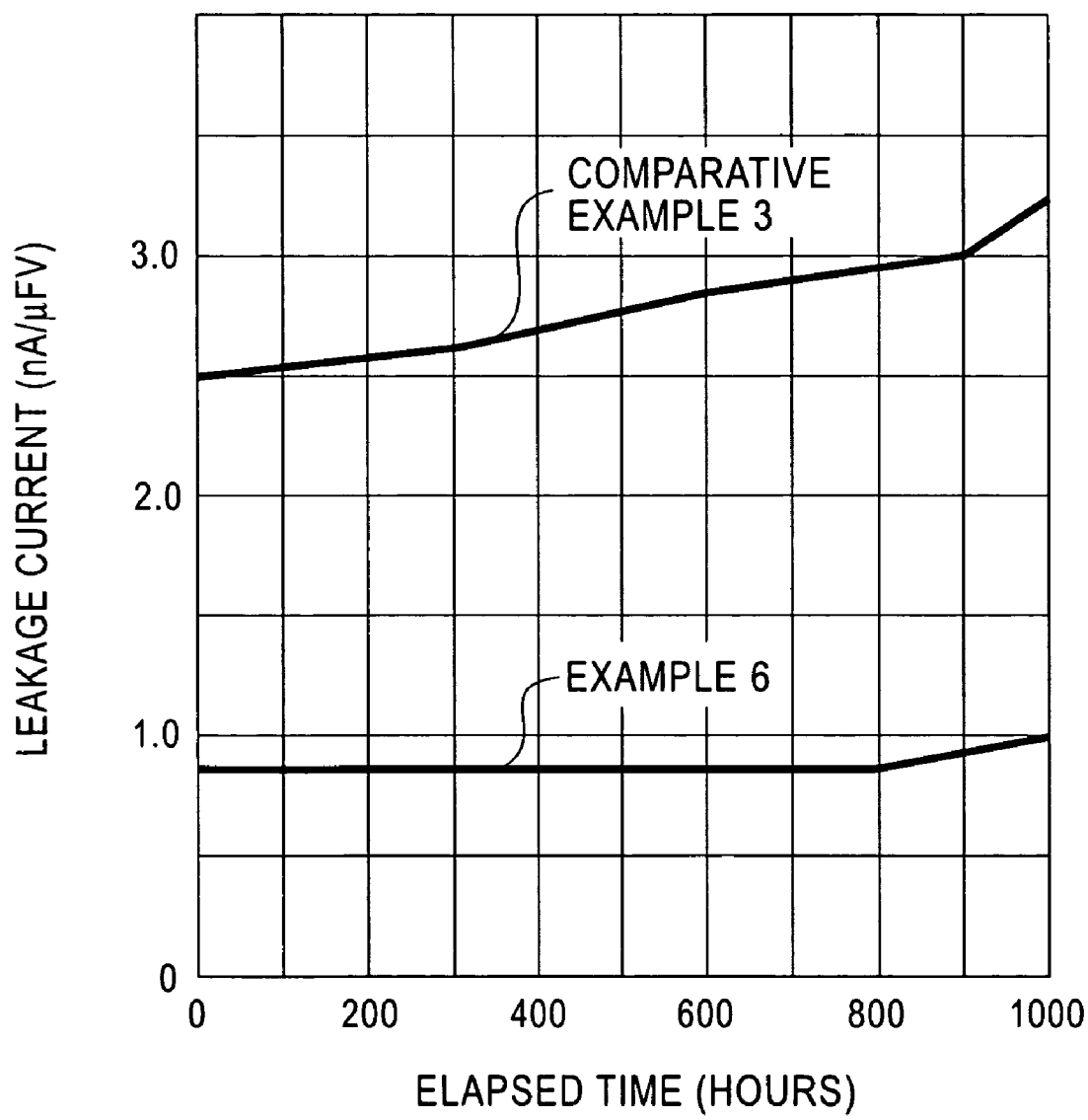
FIG. 2 is a graph showing a change in the leakage current with time.

The change in the leakage current was measured with time for 1,000 hours using the tantalum powders of Example 6 and Comparative Example 3. FIG. 2 shows the results.

The results showed that the change with time in the leakage current of the solid electrolyte capacitor of Example 6 of the present invention was small for a long period of time, and thus high reliability was exhibited. In contrast, the results in the case of Comparative Example 3 showed that the leakage current started to increase immediately after the initiation of the test.

Example 13

A tantalum powder was prepared with the same apparatuses and under the same reaction conditions as those in Example 1 except that the flow rate of hydrogen gas introduced into the plasma arc in Example 1 was changed from 80 NL/min to 40 NL/min. This powder was not subjected to the subsequent heat treatment. Table 4 shows the results.

Although this tantalum powder contained only hydrogen, since this powder was within the range of the present invention, a powder having a low leakage current and a high capacitance could be obtained.

Example 14

A tantalum powder was prepared with the same apparatuses and under the same reaction conditions as those in Example 1 except that 80 NL/min of hydrogen gas introduced into the plasma arc in Example 1 was changed to a mixed gas of 40 NL/min of hydrogen gas and 10 NL/min of nitrogen gas. This powder was not subjected to the subsequent heat treatment. Table 4 shows the results.

Although this was a tantalum powder containing hydrogen and nitrogen prepared by combining nitrogen together with hydrogen during the gas-phase hydrogen reduction reaction, since this powder was within the range of the present invention, a powder having a low leakage current and a high capacitance could be obtained.

Comparative Example 7

A tantalum powder was prepared with the same apparatuses and under the same reaction conditions as those in Example 1 except that the flow rate of hydrogen gas introduced into the plasma arc in Example 13 was changed to 120 NL/min instead of 40 NL/min. This powder was not subjected to the subsequent heat treatment. Table 4 shows the results.

In a tantalum powder containing only hydrogen, when the powder is out of the range of the present invention, the powder had a higher leakage current and a lower capacitance compared with those in Example 13.

TABLE 1

|  | Processing temperature (° C.) | BET specific surface area (m²/g) | Hydrogen content (ppm) | Hydrogen/ Specific surface area | Nitrogen content (ppm) | Nitrogen/ Specific surface area | Leakage current nA/μFV | Capacitance μFV/g |
|---|---|---|---|---|---|---|---|---|
| Example 1 | 300 | 4.2 | 400 | 95 | 200 | 48 | 0.5 | 200000 |
| Example 2 | 400 | 4.2 | 300 | 71 | 600 | 143 | 0.5 | 200000 |
| Example 3 | 500 | 4.2 | 200 | 48 | 1000 | 238 | 0.4 | 200000 |
| Example 4 | 700 | 4.2 | 50 | 12 | 3000 | 714 | 0.5 | 160000 |
| Comparative Example 1 | 750 | 4.2 | 40 | 9.5 | 6000 | 1429 | 1 | 150000 |
| Comparative Example 2 | Without treatment | 4.2 | 500 | 119 | 100 | 24 | 1 | 150000 |

TABLE 2

|  | Processing temperature (° C.) | BET specific surface area (m²/g) | Hydrogen content (ppm) | Hydrogen/ Specific surface area | Nitrogen content (ppm) | Nitrogen/ Specific surface area | Leakage current nA/μFV | Capacitance μFV/g |
|---|---|---|---|---|---|---|---|---|
| Example 5 | 200 | 8.8 | 600 | 68 | 400 | 45 | 0.8 | 420000 |
| Example 6 | 300 | 8.8 | 500 | 57 | 800 | 91 | 0.9 | 420000 |
| Example 7 | 400 | 8.8 | 400 | 45 | 1500 | 170 | 0.8 | 410000 |
| Example 8 | 550 | 8.8 | 150 | 17 | 5100 | 580 | 0.8 | 360000 |
| Comparative Example 3 | 600 | 8.8 | 80 | 9.1 | 7300 | 830 | 2.5 | 350000 |
| Comparative Example 4 | Without treatment | 8.8 | 1000 | 114 | 100 | 11 | 2.3 | 350000 |

TABLE 3

|  | Processing temperature (° C.) | BET specific surface area (m²/g) | Hydrogen content (ppm) | Hydrogen/ Specific surface area | Nitrogen content (ppm) | Nitrogen/ Specific surface area | Leakage current nA/μFV | Capacitance μFV/g |
|---|---|---|---|---|---|---|---|---|
| Example 9 | 400 | 3.2 | 200 | 63 | 150 | 47 | 0.4 | 144000 |
| Example 10 | 500 | 3.2 | 100 | 31 | 1000 | 313 | 0.4 | 144000 |
| Example 11 | 600 | 3.2 | 70 | 22 | 1550 | 484 | 0.5 | 145000 |
| Comparative Example 5 | 1000 | 3.2 | 30 | 9.4 | 15000 | 4688 | 0.6 | 140000 |
| Comparative Example 6 | Without treatment | 3.2 | 400 | 125 | 100 | 31 | 0.6 | 140000 |

TABLE 4

|  | Processing temperature (° C.) | BET specific surface area (m²/g) | Hydrogen content (ppm) | Hydrogen/ Specific surface area | Nitrogen content (ppm) | Nitrogen/ Specific surface area | Leakage current nA/μFV | Capacitance μFV/g |
|---|---|---|---|---|---|---|---|---|
| Example 13 | Without treatment | 4.2 | 400 | 96.2 | <10 | <2.4 | 0.5 | 200000 |
| Example 14 | Without treatment | 4.1 | 400 | 97.6 | 400 | 97.6 | 0.5 | 200000 |

TABLE 4-continued

| | Processing temperature (° C.) | BET specific surface area (m²/g) | Hydrogen content (ppm) | Hydrogen/ Specific surface area | Nitrogen content (ppm) | Nitrogen/ Specific surface area | Leakage current nA/µFV | Capacitance µFV/g |
|---|---|---|---|---|---|---|---|---|
| Comparative Example 7 | Without treatment | 4.2 | 700 | 167 | <10 | <2.4 | 1 | 150000 |

The invention claimed is:

1. A hydrogen-containing powder having a nitrogen content of less than 10 ppm, wherein a value obtained by dividing the hydrogen content (ppm) of the tantalum powder by the specific surface area (m²/g) of the tantalum powder is in the range of 10 to 100.

2. The tantalum powder according to claim 1, wherein the specific surface area of the tantalum powder is in the range of 4 to 10 m²/g.

3. An anode for a solid electrolyte capacitor comprising the tantalum powder according to claim 2.

4. A solid electrolyte capacitor comprising the anode for a solid electrolyte capacitor according to claim 3.

5. An anode for a solid electrolyte capacitor comprising the tantalum powder according to claim 1.

6. A solid electrolyte capacitor comprising the anode for a solid electrolyte capacitor according to claim 5.

7. A hydrogen and nitrogen-containing tantalum powder, wherein
a value obtained by dividing the hydrogen content (ppm) of the tantalum powder by the specific surface area (m²/g) of the tantalum powder is in the range of 10 to 100; and
a value obtained by dividing the nitrogen content (ppm) of the tantalum powder by the specific surface area (m²/g) of the tantalum powder is 500 or less.

8. The tantalum powder according to claim 7, wherein the specific surface area of the tantalum powder is in the range of 4 to 10 m²/g.

9. An anode for a solid electrolyte capacitor comprising the tantalum powder according to claim 8.

10. A solid electrolyte capacitor comprising the anode for a solid electrolyte capacitor according to claim 8.

11. An anode for a solid electrolyte capacitor comprising the tantalum powder according to claim 7.

12. A solid electrolyte capacitor comprising the anode for a solid electrolyte capacitor according to claim 11.

13. The tantalum powder according to claim 7, wherein the value obtained by dividing the nitrogen content (ppm) of the tantalum powder by the specific surface area (m²/g) of the tantalum powder is from 40 to 300.

14. The tantalum powder according to claim 7, wherein the hydrogen content is from 50 to 600 ppm.

15. The tantalum powder according to claim 7, wherein the nitrogen content is from 150 to 5100 ppm.

16. The tantalum powder according to claim 7, wherein the hydrogen content is from 50 to 600 ppm; and the nitrogen content is from 150 to 5100 ppm.

* * * * *

UNITED STATES PATENT AND TRADEMARK OFFICE
CERTIFICATE OF CORRECTION

| | | |
|---|---|---|
| PATENT NO. | : 7,729,104 B2 | |
| APPLICATION NO. | : 11/547588 | |
| DATED | : June 1, 2010 | |
| INVENTOR(S) | : Nobuyuki Sato et al. | |

It is certified that error appears in the above-identified patent and that said Letters Patent is hereby corrected as shown below:

Column 13, line 13 (Claim 1, line 1):

before "power" insert --tantalum--.

Column 14, line 19 (Claim 10, line 2):

delete "8" and insert --9--.

Signed and Sealed this
Third Day of July, 2012

David J. Kappos
*Director of the United States Patent and Trademark Office*